US009442754B1

(12) United States Patent
Tsirkin

(10) Patent No.: US 9,442,754 B1
(45) Date of Patent: Sep. 13, 2016

(54) DEFERRED ASYNCHRONOUS ACTIONS FOR VIRTUAL DEVICES

(71) Applicant: Red Hat Israel, Ltd., Raanana (IL)

(72) Inventor: Michael Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/723,343

(22) Filed: May 27, 2015

(51) Int. Cl.
*G06F 9/455* (2006.01)
*G06F 9/54* (2006.01)

(52) U.S. Cl.
CPC ............ *G06F 9/45558* (2013.01); *G06F 9/545* (2013.01); *G06F 2009/45575* (2013.01)

(58) Field of Classification Search
CPC ............... G06F 9/45558; G06F 9/545; G06F 2009/45575
USPC .......................................................... 718/1
See application file for complete search history.

(56) References Cited

U.S. PATENT DOCUMENTS

| 8,209,685 | B1* | 6/2012 | Getlin | G06F 9/5027 707/613 |
| 8,601,498 | B2 | 12/2013 | Laurich et al. | |
| 8,910,153 | B2 | 12/2014 | Gupta et al. | |
| 2007/0209040 | A1* | 9/2007 | Alstad | H04L 63/12 719/315 |
| 2008/0222633 | A1 | 9/2008 | Kami | |
| 2009/0089790 | A1* | 4/2009 | Manczak | G06F 9/522 718/104 |
| 2009/0092137 | A1* | 4/2009 | Haigh | H04L 12/4641 370/392 |
| 2010/0290422 | A1* | 11/2010 | Haigh | H04L 12/4641 370/329 |
| 2010/0306764 | A1* | 12/2010 | Khanna | G06F 11/1482 718/1 |
| 2014/0101306 | A1 | 4/2014 | Murgia | |
| 2014/0324793 | A1 | 10/2014 | Glazemakers | |
| 2015/0023346 | A1* | 1/2015 | Haigh | H04L 12/4641 370/389 |
| 2015/0032910 | A1 | 1/2015 | Yehuda et al. | |
| 2015/0288624 | A1* | 10/2015 | Raindel | H04L 49/90 709/219 |

FOREIGN PATENT DOCUMENTS

EP 2677425 12/2013

OTHER PUBLICATIONS

M. Mustafa Rafique et al., "Designing Accelerator-Based Distributed Systems for High Performance," Proceedings of the 10th IEEE/ACM International Symposium on Cluster, Cloud and Grid Computing (CCGRID), May 2010, 10 pages, Melbourne, Victoria, Australia.

(Continued)

*Primary Examiner* — Qing Chen
(74) *Attorney, Agent, or Firm* — Lowenstein Sandler LLP

(57) ABSTRACT

A system and methods are disclosed for handling requests from virtual machines in virtualized systems that include an accelerator. In accordance with one embodiment, a hypervisor executed by a processing device receives an asynchronous request from a virtual machine. The hypervisor detects that an accelerator is not initialized, and stores in memory at least one of the asynchronous request, an indication of the asynchronous request, or an indication that the accelerator is not initialized. The hypervisor subsequently detects that the accelerator has become initialized, and in response forwards the asynchronous request to the accelerator.

19 Claims, 5 Drawing Sheets

(56) References Cited

OTHER PUBLICATIONS

M. Mustafa Rafique et al., "Supporting MapReduce on Large-Scale Asymmetric Multi-Core Clusters," Department of Computer Science, Virginia Tech and Institute of Computer Science, FORTH, Apr. 21, 2009, pp. 25-34, Blacksburg, Virginia, USA, Heraklion, Greece.

Tahlia Richardson et al., "Red Hat Enterprise Linux 6, Virtualization Host Configuration and Guest Installation Guide," Virtualization Host Configuration and Guest Installation Guide, [retrieved Feb. 26, 2015], 2013, 255 pages, Internet: <https://access.redhat.com/documentation/en-US/Red_Hat_Enterprise_Linux/6/html-single/Virtualization_Host_Configuration_and_Guest_Installation_Guide/>.

* cited by examiner

DEFERRED ASYNCHRONOUS ACTIONS FOR VIRTUAL DEVICES

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, typically in a one-to-one fashion, to a device of the host machine (e.g., a network interface device, a CD-ROM drive, etc.). The hypervisor manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
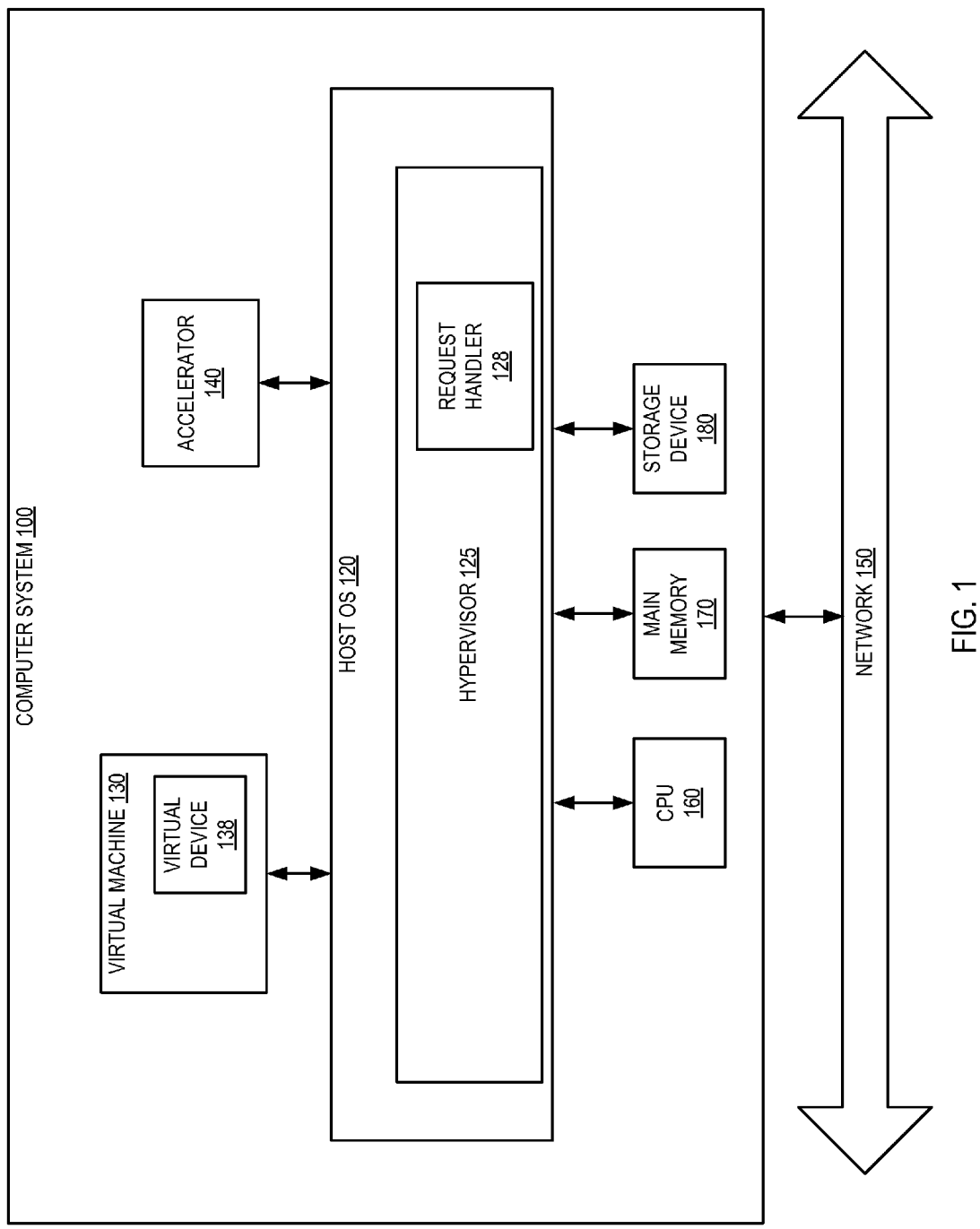
FIG. 1 depicts an illustrative computer system architecture, in accordance with an embodiment of the present disclosure.

Described herein is a system and methods for handling requests from virtual machines in virtualized systems that include an accelerator (e.g., a Graphics Processing Unit [GPU], a cryptographic accelerator, a Transmission Control Protocol [TCP] accelerator, a Secure Sockets Layer [SSL] accelerator, etc.). In accordance with one embodiment, a hypervisor executed by a processing device receives an asynchronous request from a virtual machine (e.g., a request to transmit a packet, a request to receive a packet, etc.). The hypervisor detects that an accelerator is not initialized, and stores in memory at least one of the asynchronous request, an indication of the asynchronous request, or an indication that the accelerator is not initialized. The hypervisor subsequently detects that the accelerator has become initialized, and in response forwards the asynchronous request to the accelerator.

In some examples, the accelerator may be hosted by the same machine as the hypervisor, while in some other examples the accelerator may be hosted by a different machine. In some aspects, the accelerator may comprise software that executes in a kernel space of a host operating system, or in a user space of a host operating system.

In one embodiment, the hypervisor is also capable of detecting an error caused by the accelerator after the asynchronous request has been forwarded to the accelerator (e.g., a floating-point error, a buffer overflow error, an error caused by a hardware failure, etc.). In response to detecting the error, the hypervisor transmits a message to the virtual machine indicating that an asynchronous error has occurred.

In some embodiments, the hypervisor is also capable of servicing synchronous requests (e.g., a request to enable a physical device, a request to enable a virtual device, a request to set a parameter of a physical device [e.g., an address, a number of queues, etc.], a request to set a parameter of a virtual device, a request to retrieve a parameter of a physical device, a request to retrieve a parameter of a virtual device, etc.) from a virtual machine, without involvement of the accelerator. In one such embodiment, the hypervisor services the synchronous request by emulating the accelerator.

In some examples, the hypervisor is also capable of handling errors caused by initialization of an accelerator. In one embodiment, the hypervisor receives from a virtual machine an asynchronous request that can be serviced by an accelerator. The hypervisor detects that the accelerator is not initialized, and stores in memory at least one of the asynchronous request, an indication of the asynchronous request, or an indication that the accelerator is not initialized. The hypervisor subsequently detects the occurrence of an error caused by initialization of the accelerator (e.g., an internal accelerator error, a lack of internal resources [e.g., memory, etc.]), and transmits a message to the virtual machine indicating that the error occurred.

Embodiments of the present disclosure thus enable the use of accelerators in virtualized systems, without requiring that the accelerators be initialized before a virtual machine is started. In contrast, in virtualized systems of the prior art, accelerators should be pre-initialized to ensure that they are immediately available to serve VM requests—which delays the initialization and starting of virtual machines. Consequently, embodiments of the present disclosure enable virtualized systems to initialize accelerators and virtual machines in parallel, thereby improving performance without compromising any functionality or speedup capabilities of the accelerators.

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted by FIG. 1.

As shown in FIG. 1, the computer system 100 is connected to a network 150 and comprises central processing unit (CPU) 160, main memory 170, which may include volatile memory devices (e.g., random access memory (RAM)), non-volatile memory devices (e.g., flash memory), and/or other types of memory devices, and storage device 180 (e.g., a magnetic hard disk, a Universal Serial Bus [USB] solid state drive, a Redundant Array of Independent Disks [RAID] system, a network attached storage [NAS] array, etc.). The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 runs a host operating system (OS) 120 that manages the hardware resources of the computer system and that provides functions such as interprocess communication, scheduling, virtual memory management, and so forth. In some examples, host operating system 120 also comprises a hypervisor 125, which provides a virtual operating platform for virtual machine 130 and that manages its execution.

Virtual machine 130 is a software implementation of a machine that executes programs as though it were an actual physical machine. In some examples, virtual machine 130 comprises a guest operating system (OS) 135 and a virtual device 138, as shown in FIG. 1. Guest operating system (OS) 135 manages computer resources and provides functions such as interprocess communication, scheduling, memory management, and so forth.

Virtual device 138 is software that emulates a physical device and that maps to a physical device (e.g., storage device 180, another physical device not depicted in FIG. 1, etc.). In one embodiment, hypervisor 125 manages this mapping in a transparent fashion, so that guest OS 135 and applications executing on virtual machine 130 interact with virtual device 138 as though it were an actual physical device.

It should be noted that although, for simplicity, a single virtual machine is depicted in FIG. 1, in some other embodiments computer system 100 may host a plurality of virtual machines. Similarly, although a single virtual device is depicted in FIG. 1, in some other embodiments virtual machine 100 may comprise a plurality of virtual devices.

As shown in FIG. 1, computer system 100 also includes an accelerator 140 comprising hardware, software, or both (e.g., a GPU, a cryptographic accelerator, a TCP accelerator, an SSL accelerator, etc.) for speeding up the operation of virtual devices (e.g., virtual device 138 of VM 130, etc.). It should be noted that although accelerator 140 is depicted in FIG. 1 as executing on the same machine as hypervisor 125 (i.e., computer system 100), in some other embodiments accelerator 140 might execute on a different machine (not depicted in FIG. 1). It should further be noted that in some embodiments accelerator 140 may comprise software that executes in a kernel space of a host operating system (e.g., a kernel space of host OS 120 when accelerator 140 is hosted by computer system 100, etc.), or in a user space of a host operating system (e.g., a user space of host OS 120, etc.).

In accordance with one example, hypervisor 125 may include a request handler 128 that is capable of receiving from virtual machine 130 asynchronous and synchronous requests that can be serviced by accelerator 140, of detecting whether accelerator 140 is initialized, of forwarding requests to accelerator 140, of detecting errors associated with accelerator 140, and of transmitting messages to virtual machine 130, as is described in detail below with respect to FIGS. 2 through 5. It should be noted that in some other examples, hypervisor 125 may be external to host OS 120, rather than embedded within host OS 120.

Figure 2:
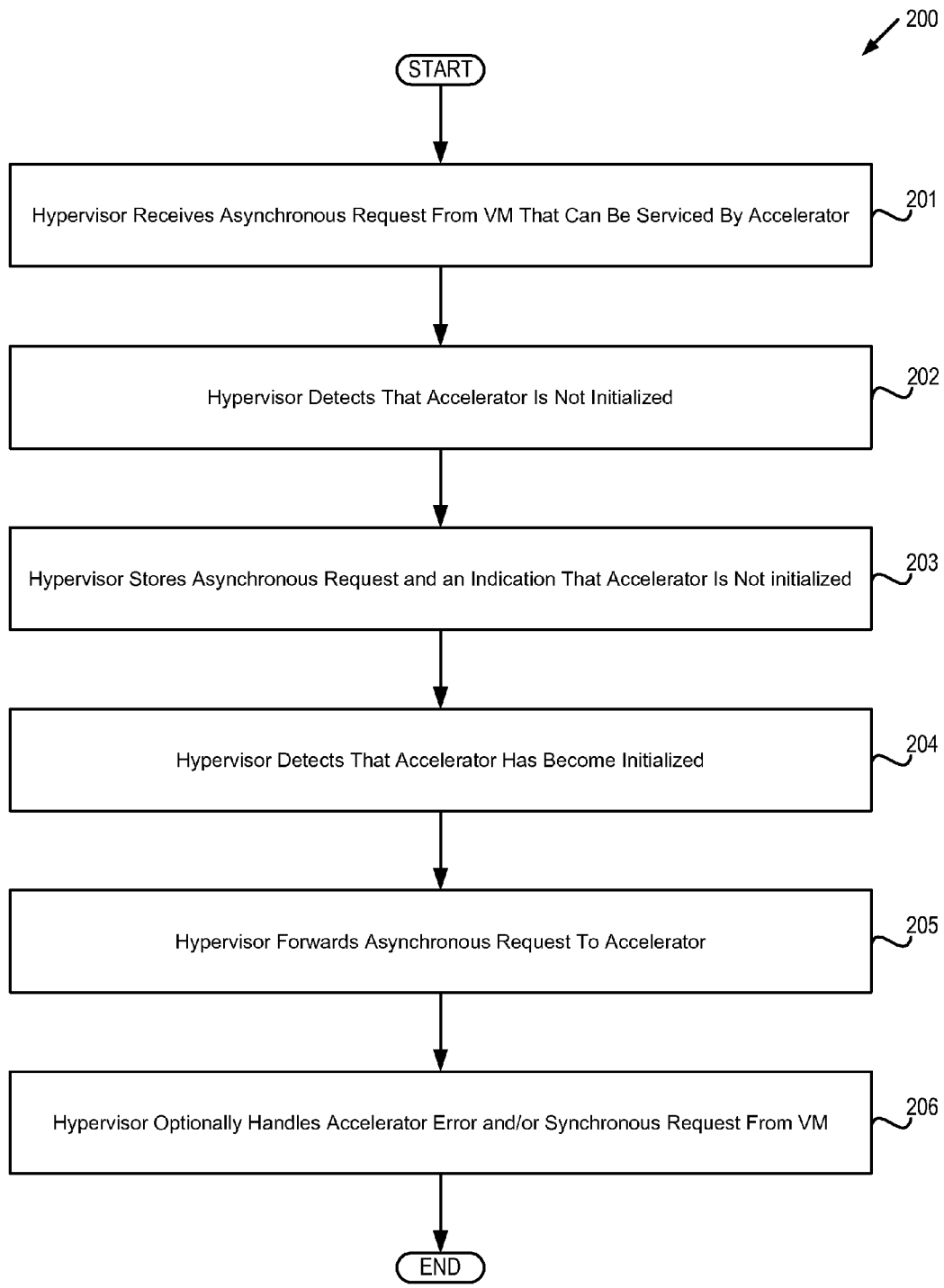
FIG. 2 depicts a flow diagram of one embodiment of a first method by which a virtualized system having an accelerator handles an asynchronous request from a virtual machine.

FIG. 2 depicts a flow diagram of one embodiment of a first method 200 by which a virtualized system having an accelerator handles an asynchronous request from a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 2 may be performed simultaneously or in a different order than that depicted.

At block 201, hypervisor 125 receives from virtual machine 130 an asynchronous request that can be serviced by accelerator 140 (e.g., a request to transmit a packet, a request to receive a packet, etc.). At block 202, hypervisor 125 detects that accelerator 140 is not initialized (e.g., via inspection of a state variable in memory, via a message or a lack of confirmation from accelerator 140, etc.). In one example, block 202 is performed by request handler 128.

At block 203, hypervisor 125 stores in memory (e.g., main memory 170, storage device 180, etc.) the asynchronous request and an indication that accelerator 140 is not initialized. It should be noted that in some other embodiments, hypervisor 125 might store one of these data in memory, rather than both. Similarly, in some other embodiments, hypervisor might store an indication of the asynchronous request (e.g., by incrementing a counter, by storing an address or pointer to the asynchronous request, etc.) instead of, or in addition, to the request itself. In one example, block 203 is performed by request handler 128.

At block 204, hypervisor 125 detects that accelerator 140 has become initialized (e.g., via inspection of a state variable in memory, via a message from accelerator 140 or from host operating system 120, etc.). At block 205, hypervisor 125 forwards the asynchronous request to accelerator 140. In one example, blocks 204 and 205 are performed by request handler 128.

At optional block 206, hypervisor 125 handles an error caused by accelerator 140 and/or a synchronous request from virtual machine 130. A method for handling accelerator errors and synchronous VM requests is described in detail below with respect to FIG. 3.

Figure 3:
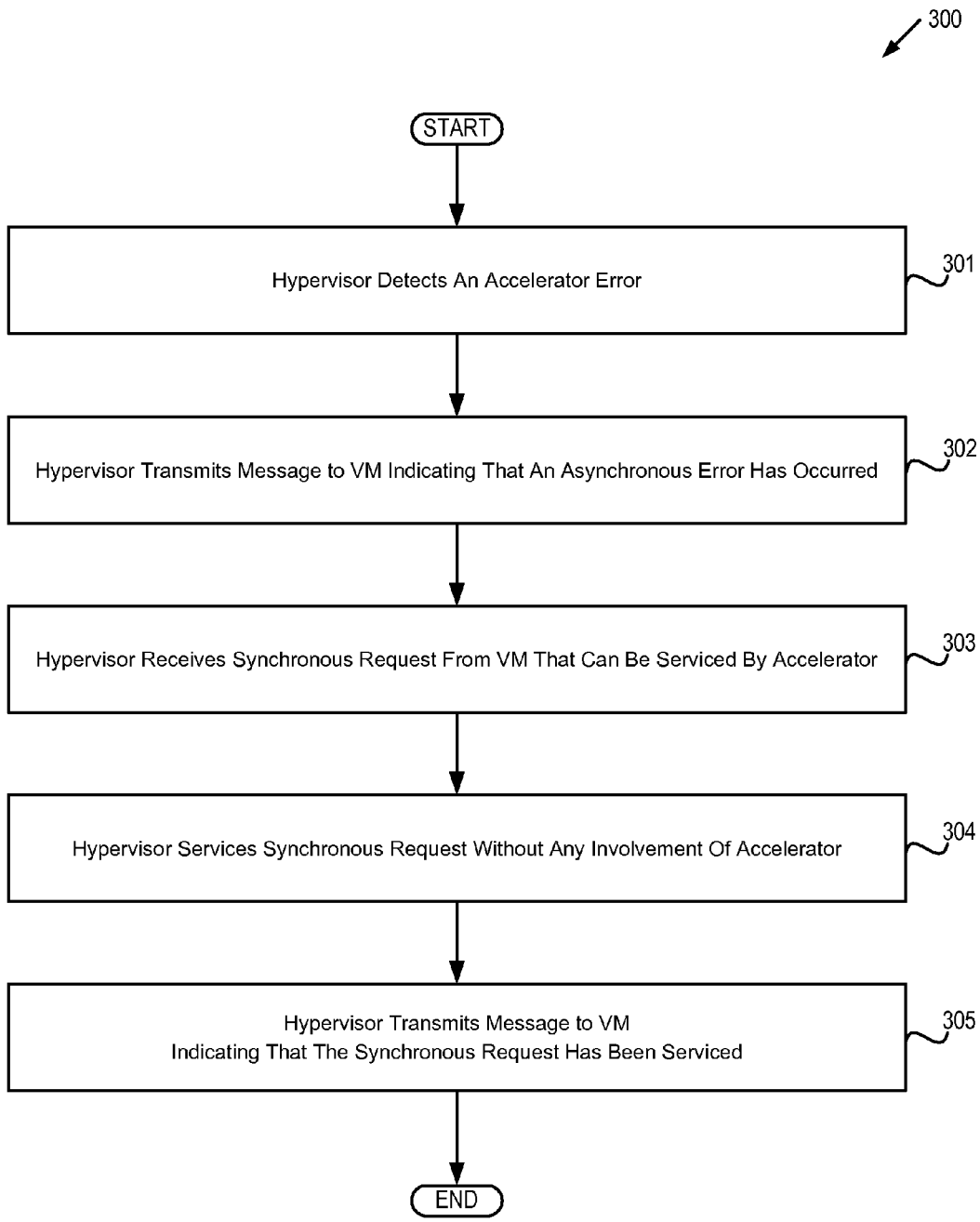
FIG. 3 depicts a flow diagram of one embodiment of a method for handling accelerator errors and synchronous virtual machine requests.

FIG. 3 depicts a flow diagram of one embodiment of a method 300 for handling accelerator errors and/or synchronous virtual machine requests. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 3 may be performed simultaneously or in a different order than that depicted.

At block 301, hypervisor 125 detects that an error (e.g., a floating-point error, a buffer overflow error, an error caused by a hardware failure, etc.) has been caused by accelerator 140 (e.g., via inspection of a state variable in memory, via a message from host operating system 120, via a message or lack of confirmation from accelerator 140, etc.). At block 302, hypervisor 125 transmits a message to virtual machine 130 indicating that an asynchronous error has occurred. In one example, blocks 301 and 302 are performed by request handler 128.

At block 303, hypervisor 125 receives from virtual machine 130 a synchronous request that can be serviced by accelerator 140 (e.g., a request to enable a physical device, a request to enable a virtual device, a request to set a parameter of a physical device [e.g., an address, a number of queues, etc.], a request to set a parameter of a virtual device, a request to retrieve a parameter of a physical device, a request to retrieve a parameter of a virtual device, etc.). In one example, hypervisor 125 maintains a list of the types of requests that can be serviced by accelerator 140. It should be noted that in some other embodiments, the synchronous request may be received from some other virtual machine not depicted in FIG. 1, rather than from the same virtual machine that submitted the asynchronous request in method 200.

At block 304, hypervisor 125 services the synchronous request, without any involvement of accelerator 140. In one embodiment, request handler 128 of hypervisor 125 services the synchronous request by emulating accelerator 140.

At block 305, hypervisor 125 transmits a message to virtual machine 130 indicating that the synchronous request has been serviced. It should be noted that in examples where the synchronous request is received from a virtual machine other than VM 130, hypervisor 125 transmits the message to this other virtual machine (i.e., the message is transmitted to whichever VM submitted the synchronous request). In one example, block 305 is performed by request handler 128.

Figure 4:
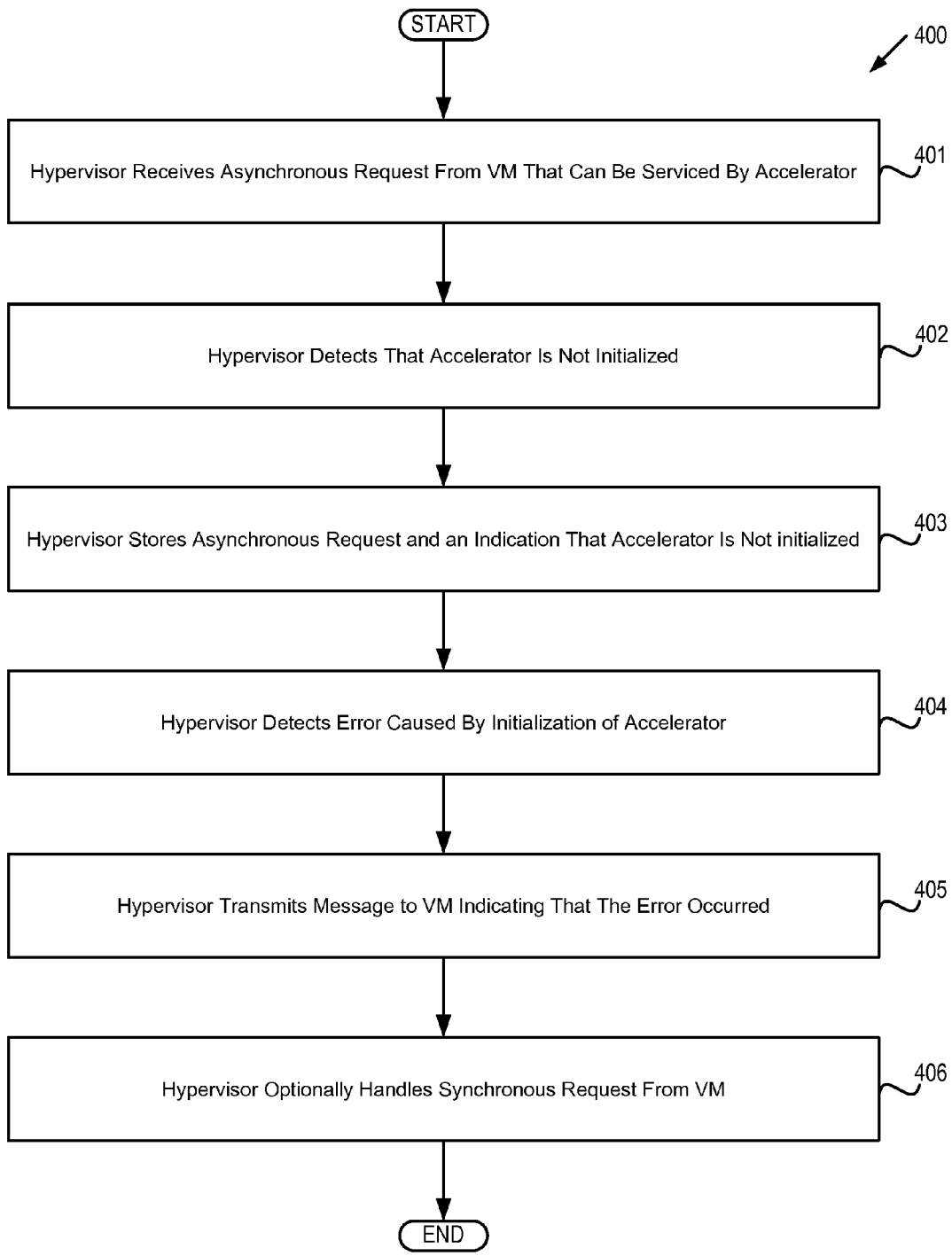
FIG. 4 depicts a flow diagram of one embodiment of a second method by which a virtualized system having an accelerator handles an asynchronous request from a virtual machine.

FIG. 4 depicts a flow diagram of one embodiment of a second method 400 by which a virtualized system having an accelerator handles an asynchronous request from a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that in some embodiments blocks depicted in FIG. 4 may be performed simultaneously or in a different order than that depicted.

At block 401, hypervisor 125 receives from virtual machine 130 an asynchronous request that can be serviced by accelerator 140 (e.g., a request to transmit a packet, a request to receive a packet, etc.). At block 402, hypervisor 125 detects that accelerator 140 is not initialized. In one example, block 402 is performed by request handler 128.

At block 403, hypervisor 125 stores in memory (e.g., main memory 170, storage device 180, etc.) the asynchronous request and an indication that accelerator 140 is not initialized. It should be noted that in some other embodiments, hypervisor 125 might store one of these data in memory, rather than both. Similarly, in some other embodiments hypervisor might store an indication of the asynchronous request (e.g., an address or pointer to the asynchronous request, etc.) instead of, or in addition to, the request itself. In one example, block 403 is performed by request handler 128.

At block 404, hypervisor 125 detects an occurrence of an error caused by initialization of accelerator 140 (e.g., via inspection of a state variable in memory, via a message from accelerator 140 or from host operating system 120, etc.). At block 405, hypervisor 125 transmits a message to virtual machine 130 indicating that the error occurred. In one example, blocks 404 and 405 are performed by request handler 128.

At optional block 406, hypervisor 125 handles a synchronous request from virtual machine 130, where the request could be serviced by accelerator 140 if it were operational (e.g., a request to enable a physical device, a request to enable a virtual device, a request to set a parameter of a physical device [e.g., an address, a number of queues, etc.], a request to set a parameter of a virtual device, a request to retrieve a parameter of a physical device, a request to retrieve a parameter of a virtual device, etc.). In one embodiment, the synchronous request is handled in a manner similar to the synchronous request handling of method 300 (for example, executing blocks 303, 304, and 305 of FIG. 3).

Figure 5:
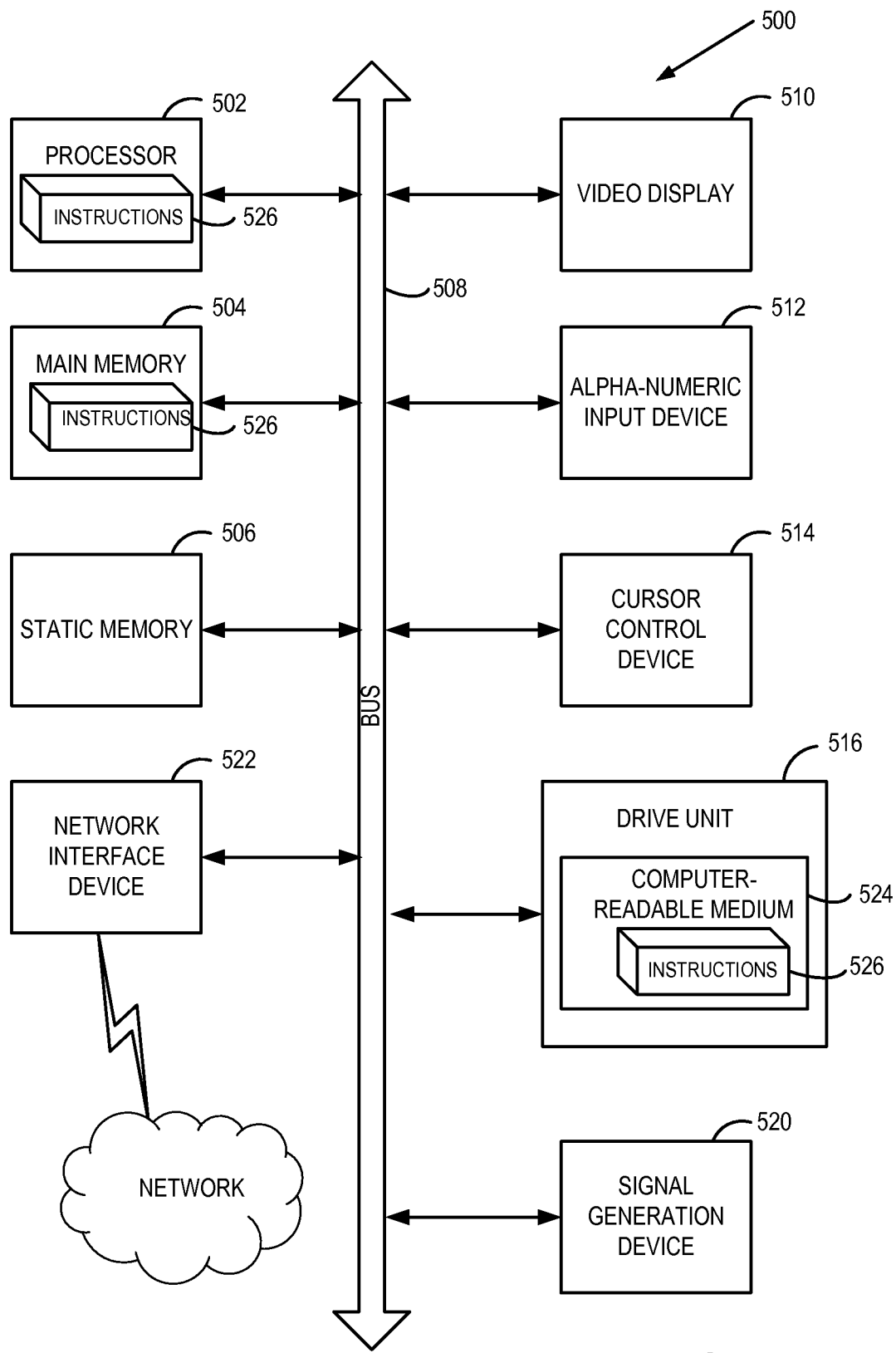
FIG. 5 depicts a block diagram of an illustrative computer system operating in accordance with embodiments of the disclosure.

FIG. 5 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 506.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the methods of FIGS. 2 through 4, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "executing", "receiving", "transmitting", "detecting", "storing", "forwarding", "servicing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein.

Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, from a virtual machine, by a hypervisor executed by a processing device, an asynchronous request that can be serviced by an accelerator;
detecting, by the hypervisor, in response to receiving the asynchronous request, that the accelerator is not initialized;
storing in a memory, by the hypervisor, at least one of the asynchronous request, an indication of the asynchronous request, or an indication that the accelerator is not initialized;
detecting, by the hypervisor, after receiving the asynchronous request and detecting that the accelerator is not initialized, that the accelerator has become initialized; and forwarding, by the hypervisor, in response to the detecting that the accelerator has become initialized, the asynchronous request to the accelerator.

2. The method of claim 1 further comprising:
detecting, by the hypervisor, after the forwarding, an error caused by the accelerator; and
transmitting, by the hypervisor, in response to the detecting of the error, a message to the virtual machine indicating that an asynchronous error has occurred.

3. The method of claim 1 further comprising:
receiving, from a virtual machine, by the hypervisor, a synchronous request;
servicing, by the hypervisor, without involvement of the accelerator, the synchronous request; and
transmitting, by the hypervisor, to the virtual machine that submitted the synchronous request, a message indicating that the synchronous request has been serviced.

4. The method of claim 1 wherein the accelerator and the hypervisor execute on different machines.

5. The method of claim 1 wherein the accelerator comprises software that executes in a kernel space of a host operating system.

6. The method of claim 1 wherein the accelerator comprises software that executes in a user space of a host operating system.

7. The method of claim 1 wherein the asynchronous request is to transmit a packet.

8. An apparatus comprising:
a memory; and
a processing device, operatively coupled to the memory, to execute a hypervisor to:
receive, from a virtual machine, by the hypervisor, an asynchronous request that can be serviced by an accelerator;
detect, by the hypervisor, in response to receiving the asynchronous request, that the accelerator is not initialized;
store in the memory, by the hypervisor, at least one of the asynchronous request, an indication of the asynchronous request, or an indication that the accelerator is not initialized;
detect, by the hypervisor, after receiving the asynchronous request and detecting that the accelerator is not initialized, that the accelerator has become initialized; and
forward, by the hypervisor, in response to the detecting that the accelerator has become initialized, the asynchronous request to the accelerator.

9. The apparatus of claim 8 wherein the processing device is further to:
detect, the hypervisor, after the forwarding, an error caused by the accelerator; and
transmit, the hypervisor, in response to the detecting of the error, a message to the virtual machine indicating that an asynchronous error has occurred.

10. The apparatus of claim 8 wherein the processing device is further to:
receive, from a virtual machine, by the hypervisor, a synchronous request;
service, by the hypervisor, without involvement of the accelerator, the synchronous request; and
transmit, by the hypervisor, to the virtual machine that submitted the synchronous request, a message indicating that the synchronous request has been serviced.

11. The apparatus of claim 10 wherein the hypervisor services the synchronous request by emulating the accelerator.

12. The apparatus of claim 10 wherein the synchronous request is to enable a device.

13. The apparatus of claim 12 wherein the device is a physical device.

14. The apparatus of claim 12 wherein the device is a virtual device.

15. A non-transitory computer-readable medium having instructions stored therein which, when executed by a processing device, cause the processing device to execute a hypervisor to:
receive, from a virtual machine, by the hypervisor, an asynchronous request that can be serviced by an accelerator;
detect, by the hypervisor, in response to receiving the asynchronous request, that the accelerator is not initialized;
store in a memory, by the hypervisor, at least one of the asynchronous request, an indication of the asynchronous request, or an indication that the accelerator is not initialized;
detect, by the hypervisor, after detecting that the accelerator is not initialized, an error caused by initialization of the accelerator; and
transmit, by the hypervisor, a message to the virtual machine indicating that the error occurred.

16. The non-transitory computer-readable medium of claim 15 wherein the instructions further cause the processing device to:
receive, from a virtual machine, by the hypervisor, a synchronous request;
service, by the hypervisor, without involvement of the accelerator, the synchronous request; and
transmit, by from the hypervisor, to the virtual machine that submitted the synchronous request, a message indicating that the synchronous request has been serviced.

17. The non-transitory computer-readable medium of claim 16 wherein the hypervisor services the synchronous request by emulating the accelerator.

18. The non-transitory computer-readable medium of claim 16 wherein the synchronous request is to set or retrieve a parameter of a device.

19. The non-transitory computer-readable medium of claim 15 wherein the asynchronous request is to receive a packet.

* * * * *